United States Patent [19]

Hollingsworth

[11] 4,272,039
[45] Jun. 9, 1981

[54] ELECTRONIC HANG GLIDER HOOK-UP WARNING SYSTEM

[76] Inventor: Thomas C. Hollingsworth, 110 Chantilly Dr., Warner Robins, Ga. 31093

[21] Appl. No.: 953,097

[22] Filed: Oct. 19, 1978

[51] Int. Cl.³ .............................................. B64D 47/02
[52] U.S. Cl. ............................ 244/1 R; 244/DIG. 1; 200/61.58 B; 340/575; 340/687
[58] Field of Search .................. 244/1 R, 16, DIG. 1, 244/3; 200/61.44, 61.13, 85 R, 61.18, 61.93, 161, 61.58 B, 51.1; 335/205; 340/575, 687, 52 E; 180/82 C

[56] References Cited

U.S. PATENT DOCUMENTS

| 1,881,878 | 10/1932 | Nidy | 340/575 |
| 2,575,926 | 11/1951 | Murray | 200/61.57 |
| 3,047,839 | 7/1962 | Brown et al. | 340/687 |
| 3,112,467 | 11/1963 | Benning | 180/82 C |
| 3,147,819 | 9/1964 | Keleher | 335/205 |
| 3,506,305 | 4/1970 | Eineman, Jr. et al. | 340/687 |
| 3,770,919 | 11/1973 | Lewis | 180/82 C |
| 3,813,060 | 5/1974 | Mochizuki | 335/205 |
| 3,876,844 | 4/1975 | Scherenberg | 200/61.57 |
| 3,980,988 | 9/1976 | Spizzo | 200/61.18 |

Primary Examiner—Galen L. Barefoot

[57] ABSTRACT

An electronic warning system that alerts a pilot of lightweight foot-launched aircraft that the required prelaunch physical hook-up of pilot-to-aircraft has not been accomplished.

3 Claims, 15 Drawing Figures

ELECTRONIC HANG GLIDER HOOK-UP WARNING SYSTEM

SUMMARY OF THE INVENTION

This invention relates to safety devices or systems and pertains particularly to a safety system for lightweight foot-launched man-carrying aircraft, both powered and unpowered. The majority of these aircraft are currently and commonly known as "hang-gliders".

The primary objective of this invention is to prevent inadvertent failure of the pilot to hook his body harness to the aircraft attach point prior to launch. The consequence of such failure is often a fatal plunge from the aircraft immediately after launch.

The invention is to provide a means whereby an audible, visual, or combination audible and visual device will warn the pilot prior to launch, that the required harness hook-up has not been accomplished. The audible system is presently considered the primary warning system and therefore, for purposes of simplicity and clarity, will be the only system addressed from this point forward with exception of the appended claims.

Another object of this invention is to provide a system of the above character which will be inexpensive to manufacture and easy to install.

The invention primarily provides for: (a) A "normally open" switch sensitive to hand or finger touch to be mounted on the aircraft control bar of the pilot's hand-hold position. This switch will hereinafter be referred to as the system activator switch. (b) A device which houses a magnet and provides a recepticle for a magnetically actuated "normally closed" switch. This device, hereinafter referred to as the system deactivator recepticle, is to be mounted on the pilot harness-to-aircraft attachment hardware (normally a carabiner or "D" ring). (c) The above mentioned magnetically actuated "normally closed" switch, hereinafter referred to as the system deactivator switch, to be mounted on the aircraft at the aircraft-to-pilot attach point. This switch is to be mounted with sufficient but limited mobility and free wire length to allow insertion of the switch into the pilot harness deactivator recepticle only at a time when proper hook-up of pilot-to-aircraft has been accomplished. Insertion of the system deactivator switch recepticle magnetically opens the deactivator switch thereby deactivating the system. (d) A box, housing a battery powered sounder and a battery. This box, hereinafter referred to as the alarm box, is to be mounted on the aircraft in close proximity to the pilot.

The invention will be best understood from a consideration of the following detailed description taken in connection with the accompanying drawings forming a part of this specification.

DESCRIPTION OF THE PREFERRED EMBODIMENTS

Figure 1:
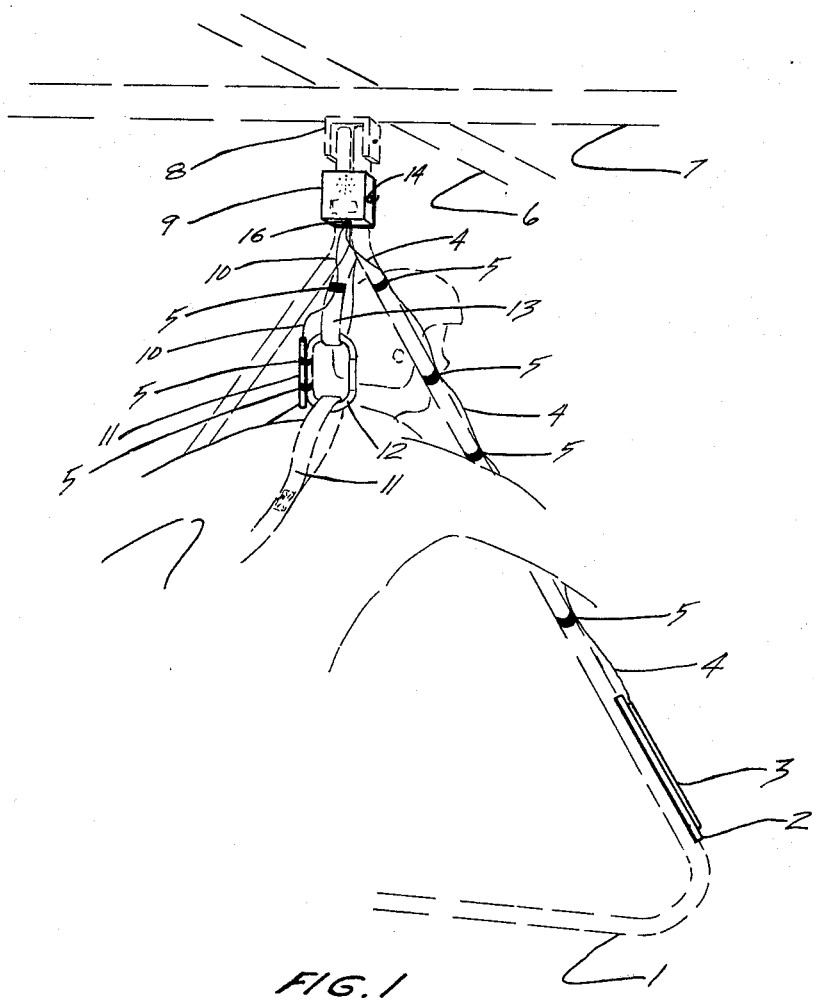
FIG. 1 shows the general arrangement and typical installation of the invention.
Figure 2:
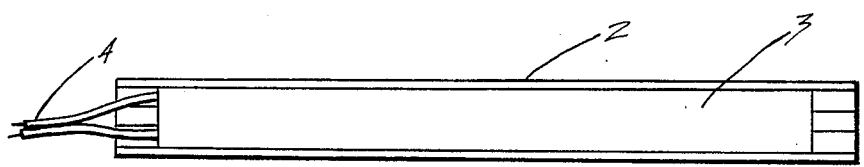
FIG. 2 is a plan view of the activator switch and mounting channel.
Figure 3:
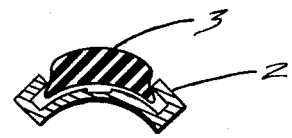
FIG. 3 is a cross-sectional elevation of the activator switch and mounting channel.
Figure 4:
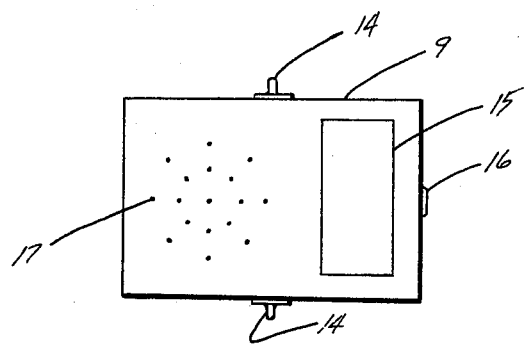
FIG. 4 is a plan view of the alarm box assembly.
Figure 5:
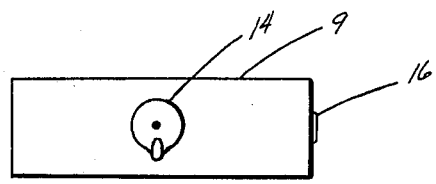
FIG. 5 is a side elevation of the alarm box assembly.
Figure 6:
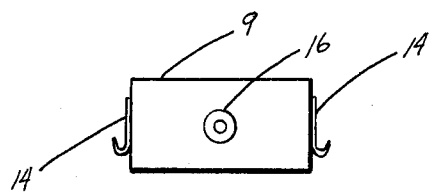
FIG. 6 is an end elevation of the alarm box assembly.
Figure 7:
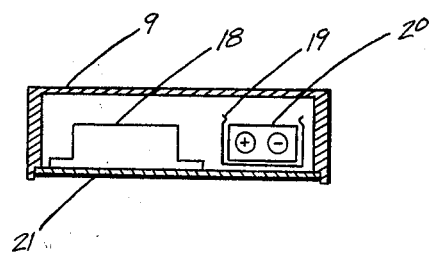
FIG. 7 is a cross-sectional side elevation of the alarm box assembly.

Referring now to the drawings in detail wherein like numerals of reference indicate the corresponding parts throughout the several views; the numerals (1), (6), (7), (8), and (13) depict existing aircraft structure and are shown in broken lines for perspective and illustrative purposes only. These components are the control bar (1), control bar attach fitting (8), keel (6), cross-bar (7), and aircraft attach point (13).

The system activator switch (3) is a "normally open" touch sensitive switch retained by a mounting channel (2). The type depicted in the several views is a "ribbon" or "tape" switch and is sensitive along its entire length. However, it will be appreciated that other type and style switchs such as the "button" or "rocker" may be utilized without departing from the spirit and scope of the invention. The mounting channel (2) is attached to the aircraft control bar in the pilots hand hold position. The manner of attachment of the channel to the control bar is normally with hose clamps; however, blind rivets, sheet metal screws, bonding agents, or the like may be utilized. Since the manner of attachment does not contribute to the merits of the invention, attachments have been omitted from FIG. 1 for purposes of clarity.

The activator switch (3) is wired to the alarm box (9) with electrical leads (4). The electrical leads (4) and (10) are retained in route with electrical adhesive tape (5) and penetrate the alarm box (9) thru a grommet (16). Other wire retaining hardware may be utilized without departing from the scope of the invention.

The alarm box (9) is attached to aircraft upper control bar structure (1) by means of rubber bands (not shown) which loop around the aircraft structure and the alarm box hooks (14). Other methods of alarm box attachment and other locations of the alarm box upon the aircraft are possible without departing from the scope of the invention. A more detailed description of the alarm box is offered by reference to FIG. 4, FIG. 5, FIG. 6, and FIG. 7. Item (14) is the box mounting hooks and item (15) shows a typical location of an identification decal. Also shown is a grommet (16) for entrance and exit of the electrical leads. Item (18) is a buzzer or sounder and item (20) is the battery power source retained by a battery clip (19).

Figure 8:
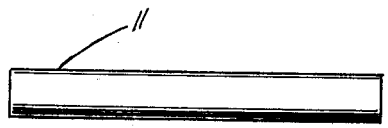
FIG. 8 is a plan view of the system deactivator recepticle.
Figure 9:
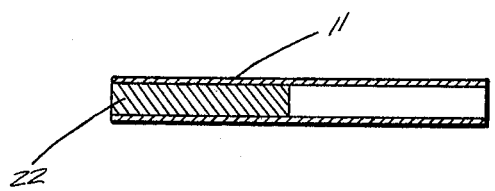
FIG. 9 is a cross-sectional plan view of the system deactivator recepticle.
Figure 10:
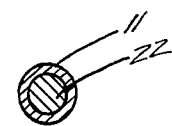
FIG. 10 is a cross-sectional elevation of the system deactivator recepticle.
Figure 11:
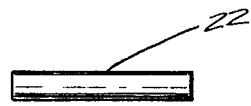
FIG. 11 is a plan view of the actuator magnet.
Figure 12:
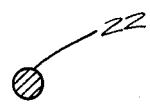
FIG. 12 is a cross-sectional elevation of the actuator magnet.
Figure 13:
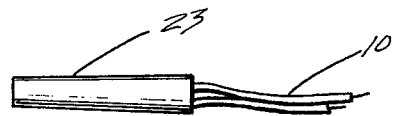
FIG. 13 is a plan view of the system deactivator switch.
Figure 14:
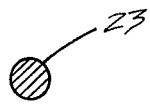
FIG. 14 is a cross-sectional elevation of the system deactivator switch.

The deactivator recepticle (11) is attached to the pilot body harness caribiner or "D" ring (12) with electrical adhesive tape (5) as shown in FIG. 1 or with similarly appropriate fastening devices. A more detailed description of the deactivator recepticle (11) is offered by reference to FIG. 8, FIG. 9, and FIG. 10 where item (22) is the actuator magnet and item (11) is the tubular deactivator recepticle.

The deactivator switch (23), a totally encapsulated magnetically actuated "normally closed" switch, cannot be seen in FIG. 1 since the illustration shows the system in the deactivated mode. For system deactivation the deactivator switch (23) is simply inserted into the deactivator recepticle (11). It will be appreciated that other type and styles of deactivation switches may be utilized without departing from the spirit and scope of this invention. To further illustrate the deactivated mode, FIG. 1 also shows in borken lines the pilot body harness (11) and caribiner (12) properly hooked to the aircraft attach point (13).

Figure 15:
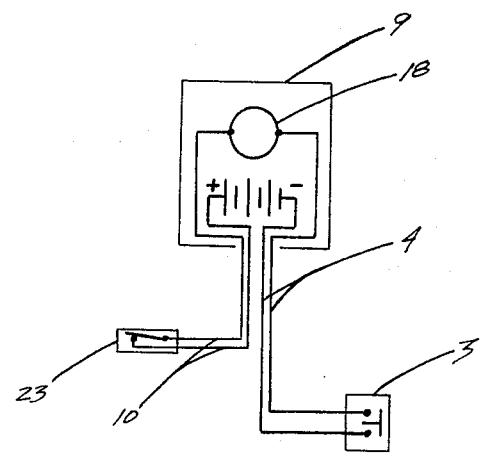
FIG. 15 is a schematic representation of the electrical circuit.

The wiring diagram shown in FIG. 15 may be modified without detracting from the merit of the invention but is shown in it's simplest operative form. Wire connectors, disconnects, plugs, etc. have not been shown throughout the several views since these components do not form a part of the invention but are of the usual standard electronic equipment.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the spirit and scope of the invention as claimed.

Having thus described my invention, what I claim is:

1. A hang-glider safety hook-up warning system with pilot awareness means for indication to the pilot that the pilot harness has not been hooked or connected to the glider, which comprises:
   a. touch sensitive switch means, having two operable positions, disposed on the glider control bar at a location so as to be actuated by the pilot's hand during take-off or launch, said touch sensitive switch means being in one operable position when in contact with the pilot's hand and in the second operable position when not in contact with the pilot's hand;
   b. switch means disposed at the glider suspension loop or glider attachment point, said glider attachment point switch means having two operable positions;
   c. receptacle means disposed at the pilot harness attachment link or carabiner into which the said glider attachment point switch means can be inserted at a time when the pilot harness attachment link is hooked to or secured to the glider attachment point;
   d. magnet means comprising a magnet associated with said receptacle means, said receptacle means receiving the said glider attachment point switch means, said glider attachment points switch means being in one operable position under the force of said magnet when inserted in said receptacle means, and being in the second operable position when said glider attachment points switch means is not inserted in said receptacle means;
   e. awareness means disposed on said glider;
   f. circuit means, including a power supply with said circuit means connecting said glider attachment point switch means to said touch sensitive switch means so that said awareness means provides an indication of the pilot being unhooked from or unattached to the glider will only occur when the pilot is holding the glider in launch position.

2. The system claimed in claim 1, said touch sensitive switch means disposed on the glider control bar, designed to close under the force of the pilot's hand when the glider is held in launch position.

3. The system claimed in claim 1, said glider attachment point switch means designed to open under the force of the magnet means when inserted in said pilot harness attachment link receptacle means.

* * * * *